United States Patent [19]

Van Huffel et al.

[11] 4,308,633

[45] Jan. 5, 1982

[54] WAX APPLICATOR LAMINATE

[76] Inventors: Phillip L. Van Huffel, 6885 Forest Valley Dr.; Alex A. Bodner, 6914 Forest Valley Dr., both of Grand Rapids, Mich. 49508

[21] Appl. No.: 54,258

[22] Filed: Jul. 2, 1979

[51] Int. Cl.3 .......... B32B 9/06; C09J 7/04; B05C 1/06

[52] U.S. Cl. .......... 15/104.93; 8/447; 118/271; 156/230; 156/289; 427/11; 427/148; 427/370; 428/352; 428/452; 428/485; 428/486; 428/913; 428/914; 428/348

[58] Field of Search .......... 156/230, 240, 289, 238, 156/155; 427/146, 147, 277, 148, 387, 370, 11, 416; 428/924, 486, 452, 485, 447, 348, 352, 913; 118/264, 271; 401/1; 8/445, 447; 280/610; 15/104.93

[56] References Cited

U.S. PATENT DOCUMENTS

| | | | |
|---|---|---|---|
| 2,658,015 | 11/1953 | Williams | 154/132 |
| 2,920,979 | 1/1960 | Hessburg et al. | 428/319 |
| 2,970,076 | 1/1961 | Porth | 427/148 X |
| 3,335,017 | 8/1967 | Spencer | 428/447 |
| 3,518,158 | 6/1970 | Hurst | 428/447 |
| 3,519,456 | 7/1970 | Reed et al. | 156/240 X |
| 3,567,571 | 3/1971 | Martinovich | 428/200 |
| 3,575,788 | 4/1971 | Funk et al. | 428/352 |
| 3,684,549 | 8/1972 | Shank | 260/28.5 A X |
| 3,922,435 | 11/1975 | Asnes | 156/240 X |
| 3,936,570 | 2/1976 | Iwata | 156/240 X |
| 4,133,939 | 1/1979 | Bokerman et al. | 428/447 |

*Primary Examiner*—Norman Morgenstern
*Assistant Examiner*—Thurman K. Page
*Attorney, Agent, or Firm*—St. Onge, Steward, Johnston & Noe

[57] ABSTRACT

A wax applicator laminate for transfering wax compounds to a surface, the wax applicator laminate comprising a carrier sheet being substantially impervious to the passage of melted wax therethrough and being less adherent to solidified wax on a first surface thereof, and a layer comprising solidified wax which is adhered to the second surface of the carrier sheet. In the method of applying a coating of wax to a surface, the carrier sheet is heated to melt the solidified wax compound and to deposit a coating of wax on the surface.

9 Claims, 8 Drawing Figures

Fig. 1.
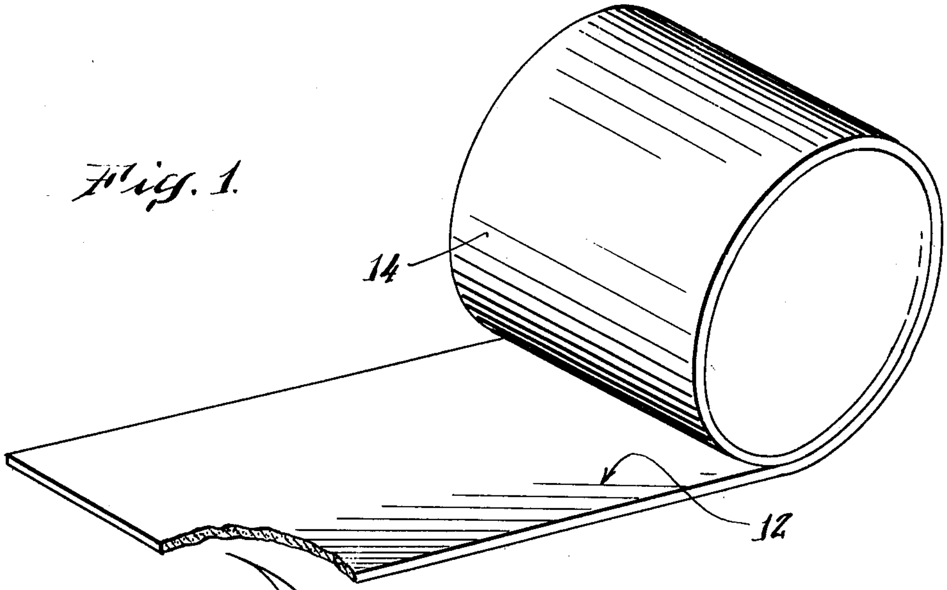
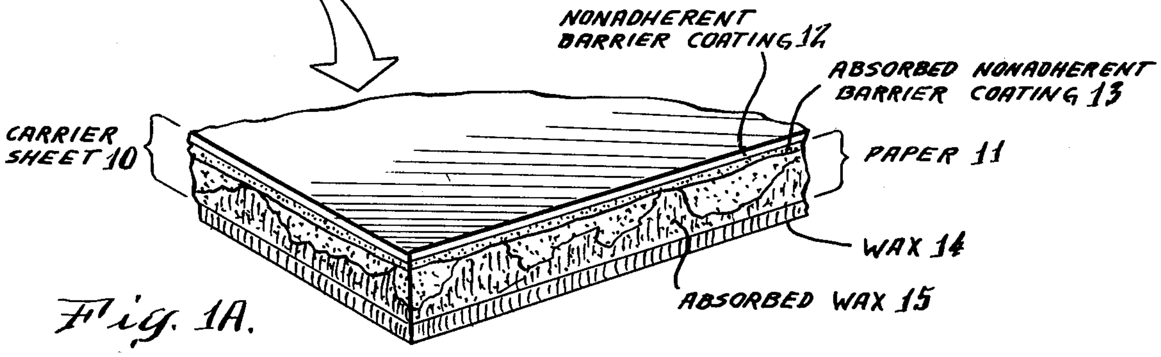
Fig. 1A.
Fig. 2.
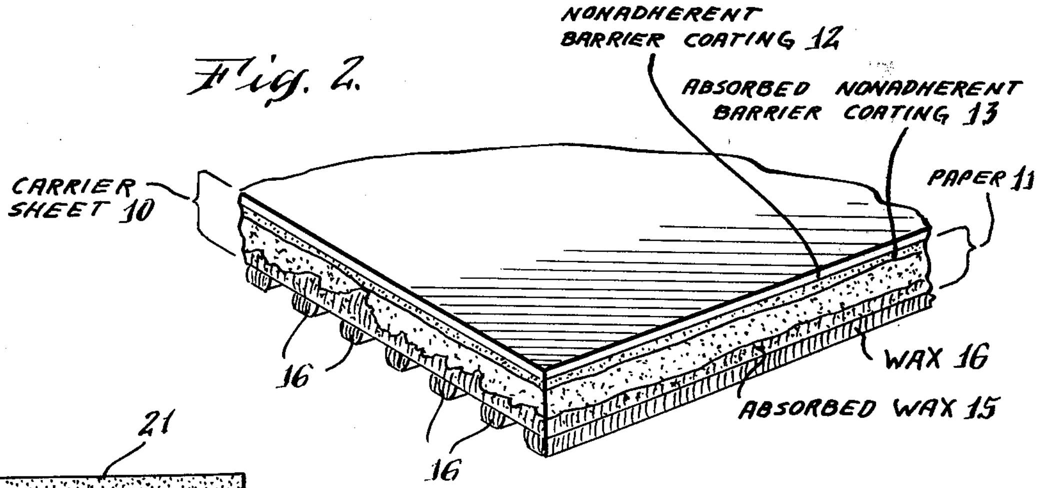
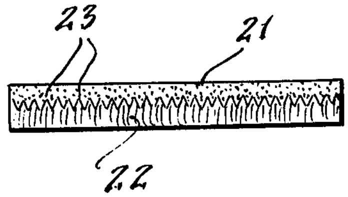
Fig. 4.

WAX APPLICATOR LAMINATE

BACKGROUND OF THE INVENTION 1. Field of the Invention

The present invention relates to an article for and a method of applying a coating of wax on a surface. More particularly, the present invention relates to a wax applicator laminate for and a method of applying a coating of wax on a surface.

2. Description of the Prior Art

It is desirable to apply a coating of wax on various surfaces. For example, wax coatings are applied to the bottoms of skis, both downhill and cross-country skis, to alter the performance characteristics of the skis to suit a particular snow condition and to protect the skis from moisture. Wax coatings are applied to surfaces of wood furniture to preserve the finish of the furniture and are applied to surfboards to increase the friction between the surfboard and the surfer's feet.

A conventional method of applying a wax coating to a surface is to contact the surface with a solid bar of wax and to rub the wax from the bar onto the surface. The wax coating provided by this method is typically non-uniform and discontinuous. The wax, when applied by hand rubbing, tends to agglomerate on portions of the surface while other portions of the surface are left uncoated. The non-uniform and discontinuous coating may then be worked into a more uniform coating by rubbing the coated surface with a smooth object such as a piece of plastic or cork. By expending much time and effort, the coating on the surface may be spread somewhat evenly, but, portions may still be left uncoated and other portions may have an agglomeration of wax. Moreover, the wax coating provided is not thoroughly impregnated into the surface being coated.

In the art of waxing downhill and cross-country skis, a coating of wax may be applied to the bottom of the skis by various methods. A wax coating may be rubbed on by hand and then heated with a hand-held propane torch to melt the wax and the melted wax is rubbed with a smooth object to obtain a more uniform coating on the surface. However, when the wax is heated, the wax tends to agglomerate and the provision of a uniform and continuous coating is difficult or impossible to achieve. A wax coating may also be applied to the skis by brushing or rolling melted wax onto the skis.

It is an object of the present invention to provide, where desired, a waxing system which is capable of providing a uniform and continuous wax coating on a surface. It is a further object of the present invention to simplify the coating process so it is less difficult and time consuming. It is a further object of the invention to provide wax coatings that are impregnated into the surface to be coated.

SUMMARY OF THE INVENTION

The present invention provides a wax applicator laminate for and a method of applying a coating of wax on a surface. The wax applicator laminate has multiple layers and includes a carrier sheet which is substantially impervious to the passage of melted wax therethrough and which is less adherent to solidified wax on a first surface thereof. A layer comprising solidified wax is adhered to the second surface of the carrier sheet. In the method of application of the wax, the surface to be coated is contacted with the wax layer and the carrier sheet is heated to melt the wax. The melted wax is deposited on the surface and the carrier paper is removed to leave a coating of wax on the surface.

The carrier sheet is a material which is capable of having wax adhered thereto, either by absorption or adsorption, and capable of releasing the wax when the carrier sheet is heated. The carrier sheet may be a porous and absortive material such as cellulose paper or a substantially nonabsorptive polymeric sheet material.

In the preferred embodiment of the invention, the carrier sheet comprises porous and absorptive material, such as cellulose paper, which is capable of absorbing melted wax. To provide the carrier paper with its non-adherent properties, a nonadherent barrier coating is formed on one side of the porous and absorptive paper. The nonadherent barrier coating, which may be, for example, a silicon resin coating, is impermeable by melted wax and resists degradation by heat. The layer of wax is formed on the other side of the carrier sheet by applying melted wax to the porous and absorptive paper and allowing a portion of the layer of wax to be absorbed into the paper. The layer of wax is sufficiently thin so that the combination of the paper and the layer of wax is pliable.

To use the wax applicator laminate, the surface to be coated is contacted with the side of the wax applicator laminate having the layer of wax thereon. Heat is applied to the nonadherent barrier coating and heat is transferred to the solidified wax layer to melt the wax layer. As the wax melts, a portion of the melted wax is deposited on the surface to be coated. Melted wax fills intersticies of the surface to provide an adherent wax coating. The wax applicator laminate is heated and pressed at a temperature and for a time sufficient for a physical equilibrium to be reached between the melted wax deposited on the surface and melted wax on the carrier sheet. The wax applicator laminate is removed from the surface and a coating of melted wax is left on the surface. When the wax cools and hardens, the surface is provided with a coating of solidified wax.

Although the waxing system of the present invention is particularly suited for coating the bottoms of skis, either crosscountry or downhill skis, the waxing system is also useful, for example, for applying a wax coating on furniture, surf boards, water skis, and the hulls of boats, fabric during batiking, or on any other surface.

The composition of the wax depends on the particular application. For example, when used for coatings on the bottom of downhill skis, the wax composition may contain hardeners selected for use with particular snow conditions. The skier may carry several types of wax applicator laminates, each having a different wax composition suitable for a particular snow condition. The skier will apply wax from the type of wax applicator laminate most suitable for the prevailing snow condition. When the wax applicator laminate is used on furniture, the wax compound may also contain stains for coloring the wood.

The waxing system of the present invention when used on skis or other smooth surfaces provides a uniform and continuous wax coating. The waxing system is convenient to use. In the method of application, a portion of the melted wax is impregnated into the interstices of the surface to provide a coating which adheres well to the surface and which protects the surface from the environment. Other advantages of the waxing system of the present invention will be apparent from the description of the drawings and the detailed description of the invention which follows.

BRIEF DESCRIPTION OF THE DRAWINGS

FIG. 1 is a perspective view of a roll of wax applicator laminate, a portion of the laminate being broken away and shown in an enlarged sectional view in FIG. 1A;

FIG. 2 is a sectional and perspective view of a second embodiment of a wax applicator laminate;

FIG. 3A shows the wax applicator laminate being contacted with an iron;

FIG. 3B shows the wax layer on the laminate beginning to melt and deposit on the surface;

FIG. 3C shows the stage of the method wherein the wax has been melted and a physical equilibrium exists between the liquid wax absorbed into the paper and the melted wax coating deposited on the surface;

FIG. 3D shows the wax applicator laminate and the heat source removed from the surface to leave a coating of wax on the surface; and FIG. 4 is a sectional view of another embodiment of a wax applicator laminate.

DESCRIPTION OF THE PREFERRED EMBODIMENT OF THE INVENTION

Figure 3A:
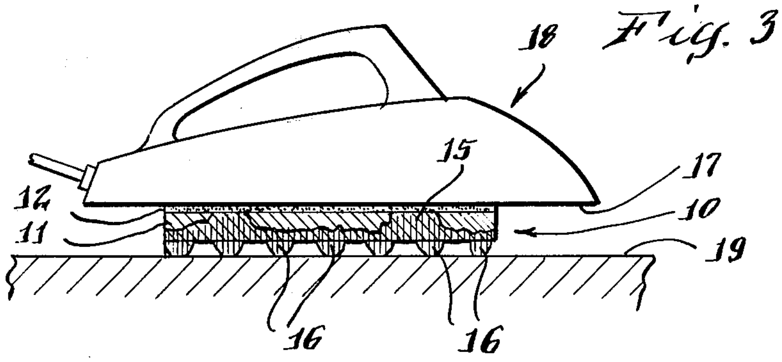
FIGS. 3A through 3D show a side section view of the wax applicator laminate shown in FIG. 2 and show various stages of the method of applying a wax coating to a surface.

Referring to FIG. 1, a perspective view of a roll of wax applicator laminate is shown. A portion of the wax applicator laminate is broken away and shown in an enlarged sectional view in FIG. 1A to show in detail the various layers of the laminate. The wax applicator laminate is pliable and may be rolled to provide compact storage.

The wax applicator laminate is multi-layered and comprises a carrier sheet 10 which is impervious to the passage of melted wax therethrough and which is substantially nonadherent on one surface thereof. In the preferred embodiment of the invention, carrier sheet 10 comprises a sheet of porous and of absorptive material 11 which is capable of absorbing melted wax. Preferably, the porous and absorptive material is cellulose fiber paper having a weight between about 30 lb. and about 50 lb. and a thickness in the range between about 2 and 5 thousandths of an inch. Alternatively, the carrier sheet may be a nonabsorbent sheet material such as a polymeric sheet which is capable of having wax adhered to one surface thereof. The surface of the polymeric sheet may contain irregularities to increase the adherence of the wax thereto.

The carrier sheet 10 includes a nonadherent barrier coating 12 which is applied to one side of the paper 11, which is impermeable by melted wax and which resists degradation when heated. By "resist degradation" is meant that the nonadherent and impermeable properties of nonadherent barrier coating 12 are maintained and the coating does not become tacky when the coating is heated to temperatures sufficiently high to melt wax. A silicone resin coating is suitable for use as nonadherent barrier coating 12. To form coating 12, a silicone resin coating composition is applied to one surface of paper 11 and is partially absorbed by the paper. When the coating composition cures, a continuous nonadherent barrier coating 12 is formed on one side of paper 11 and is bonded to the paper by the partially absorbed portion 13 of the nonadhesive barrier coating 12. Although it has been determined that a silicon resin coating is suitable for use as the nonadhesive barrier coating 21, other types of coatings having the properties described above may be used. Examples of other types of coatings include lacquers, polymeric resins or clays.

A layer of wax 14 is bonded to the side of the carrier sheet 10 opposite nonadherent barrier coating 12 by applying melted wax to the surface of paper 11. A portion 15 of the melted wax is absorbed into the paper 11 to bond the wax layer 14 to the paper 11. The nonadherent barrier coating 12 prevents melted wax from seeping through the paper 11 during manufacture of the wax transfer paper. During manufacture, the melted wax may wet substantially the entire volume of the paper between the nonadherent layers 11 and the opposite side of the paper, or, as shown in FIG. 1 may wet only a portion of the volume.

The wax layer 14 should be sufficiently thin so that the wax applicator laminate formed by the combination of the paper 11, the nonadherent barrier coating 12 and the wax layer 14 is pliable without the wax layer 14 separating from the paper 11. The thickness of the wax layer 14 will depend on the purpose for which the wax applicator laminate will be used and the composition of the wax. When the wax applicator laminate is used to apply a wax coating to skis, the wax layer should have a thickness between about 1 and about 5 thousandths of an inch, and most preferably about 2 thousandths of an inch. If the wax layer 14 is too thin, the coating of wax ultimately formed on the ski surface will be discontinuous and too thin. If the layer of wax 14 is too thick, the coating of wax ultimately formed on the surface may be nonuniform, that is the wax may tend to agglomerate on certain portions of the surface being coated. When the wax transfer paper is used to form coatings on more absorbtive materials such as on fabric during batiking, the thickness of the wax layer may be in excess of 5 thousandths of an inch so long as the wax transfer paper is pliable.

Various types of wax compositions may be used in the practice of the present invention and the type of wax composition will be selected to suit a particular application for the wax applicator laminate. For example, the wax may be a natural wax, a mineral wax, vegetable wax, animal wax or a synthetic wax, and compatible mixtures thereof. Waxes used in the practice of the present invention are characterized by crystalline to microcrystalline structure, a capacity to acquire gloss when rubbed, a low viscosity at just above the melting point of the wax, and a low solubility in solvents for fats at room temperature. Examples of waxes which may be used include: paraffin, microcrystalline, oxydized microcrystalline, montan, hoechst waxes, ozokerite, carnauba, esparto, flax, sugar cane wax, candelilla, beeswax, Japan wax, woolfat and fischer-tropsch.

The wax compound which forms a layer 12 of the wax should contain from 20 to 100 weight percent wax and preferably from 40 to 90 percent and most preferably about 50 to 85 percent. Additives may be included in the wax composition and the particular additive or additives will be selected to suit a particular application for the wax applicator laminate. For example, when the wax applicator laminate is used to form coatings on the bottom of downhill skis, the wax composition may contain a hardener or a mixture of hardeners and lubricants selected for use in a particular snow condition. The wax composition may also contain an additive or additives which assist in binding the wax coating to the surface of the ski. For example, the wax composition may contain wetting agents which provide for better adhesion of the wax coating to the bottoms of skis. When the wax transfer paper is used on furniture to preserve the finish of the furniture, the wax compound may contain stains for coloring the wood. The above additives are given by way of example, and, not by way of limitation. It should be understood that any additive compatible with the wax used may be added to the wax composition to enhance the properties of the coating applied with the wax applicator laminate. Examples of various wax compositions may be found in Bennett, *Commercial Waxes,* pp. 522–525.

As described earlier, one side of the sheet of porous and absorptive paper 11 is coated with a nonadherent barrier coating 12 which is impermeable by melted wax and which resists degradation by heat. During use of the wax applicator laminate, the solid wax layer 14 is melted by contacting the nonadherent barrier coating 12 with a heated surface, such as, for example, a hot iron. The nonadherent barrier coating 12 resists degradation by heat, that is, the nonadherent barrier coating 12 is capable of having a hot surface placed thereon for a time sufficient to melt the wax without becoming tacky. Moreover the nonadherent barrier coating 12 should be impermeable to wax to prevent the melted wax from seeping through the nonadherent barrier coating 12 and contaminating the heated surface applied thereto. The nonadherent barrier coating also serves an additional function. As shown in FIG. 1, when the wax applicator laminate is formed into a roll, the wax layer 14 contacts the nonadherent barrier coating 12. The wax composition which forms wax layer 14 may be slightly tacky at room temperature, as is the case with certain wax compositions used in cross-country skiing. The nonadherent barrier coating 12 allows the wax applicator laminate to be stored in roll form and to be unrolled without the wax layer 14 separating from the porous and absorptive paper 11.

The wax layer 14 may be formed in various shapes on the surface of porous and absorptive paper 11. As shown in FIG. 1, the wax layer 14 is applied to form a continuous layer. As shown in FIG. 2, the wax layer 14 is applied to form a plurality of independent strips 16. The various strips 16 may have the same wax composition, or, alternatively, may have different compositions. When used in batiking, the wax layer 14 may be formed in any desired design pattern, or, a sheet of wax applicator laminate having a continuous wax layer 14 as shown in FIG. 1 may be cut to the desired pattern and placed on the fabric to be batiked. Moreover, wax layer 14 may contain two or more sub-layers, one formed on top of the other, and sub-layers may be made from different wax compositions. For example, when used on skis, the outer sub-layer may be formulated for adherence to skis and the inner sub-layer may be formulated to suit a particular snow condition.

Figure 3B:
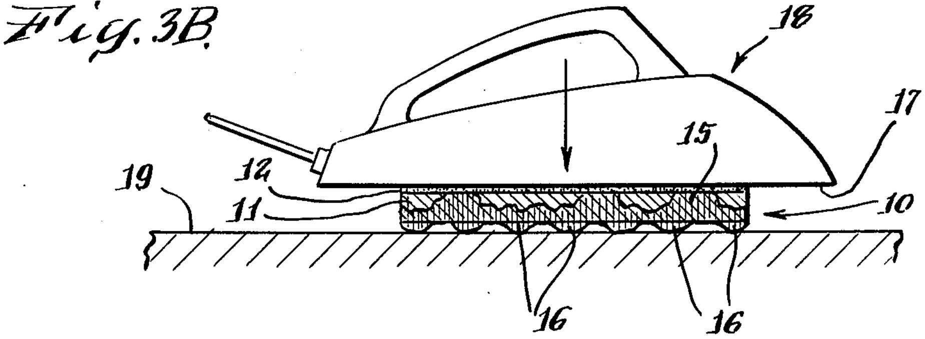

Referring to FIGS. 3A through 3D, various stages of the method of applying a wax coating are shown. FIG. 3A shows a stage wherein the wax applicator laminate is initially contacted with a heated surface 17, such as that of a household iron 18. As heat is transfered through nonadherent barrier coating 12 and paper 11 to wax layer 14, the wax layer 14 and the absorbed wax 15 begins to melt as shown in FIG. 3B. The wax applicator laminate is heated at a temperature and a time sufficient to melt the wax layer 14 and the absorbed wax. The temperature of the heated surface 17 is above the melting point of the wax composition used to form wax layer 14 and, as shown in FIG. 3, the melting wax begins forming a melted wax coating 20 on surface 19.

Figure 3C:
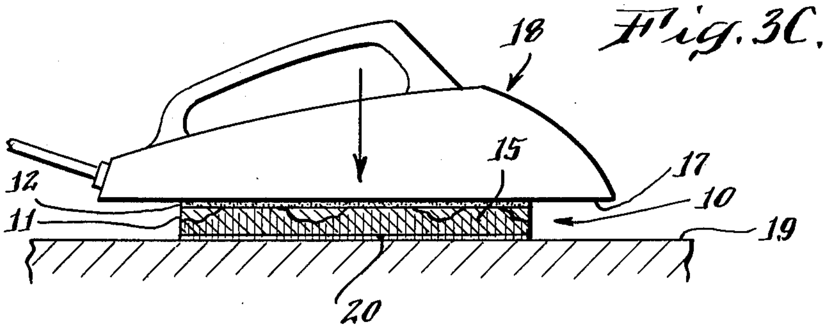

As shown in FIG. 3C, a uniform and continuous melted wax coating 20 has been deposited on surface 19. The melted wax composition is in two forms, melted wax which forms wax coating 20 and melted wax which is absorbed into paper 11. The wax applicator laminate is heated at a temperature and for a time sufficient for a physical equilibrium to be reached between the melted wax forming coating 20 and the absorbed melted wax. When the carrier sheet contains porous and absorptive paper, it is believed that a portion of melted wax is absorbed and retained in paper 11 by capillary or sponge-like action of the paper, while, the portion of the melted wax forming melted wax coating 20 is bonded to surface 19 by surface forces.

Figure 3D:
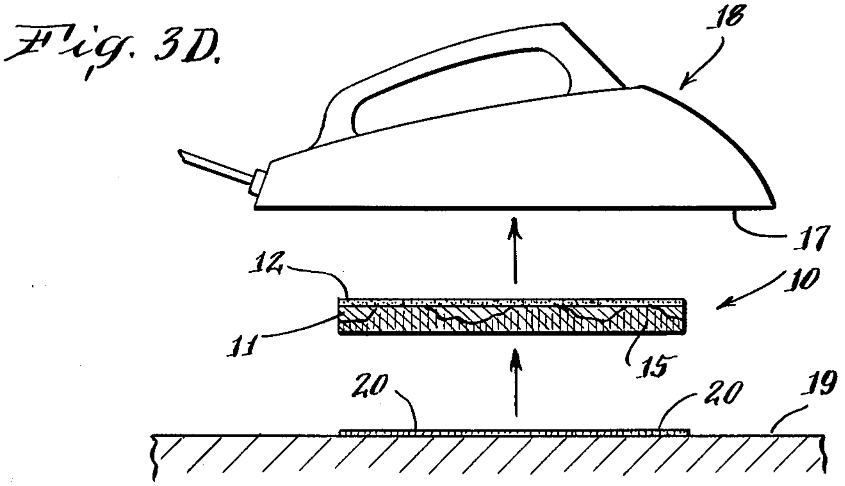

As shown in FIG. 3D, when the wax applicator laminate is removed from surface 19 after the physical equilibrium is reached, a uniform and continuous melted wax coating 20 is left on surface 19. The melted wax is cooled to form a uniform and continuous solidified wax coating. The wax coating has a matte finish which may be rubbed with a cloth or a smooth object to form a glossy finish. By "uniform" it is meant that the coating has a generally constant thickness over the entire surface area coated, although imperfections, such as slight rippling in the coating may occur. By "continuous," it is meant that the coating forms a generally integral and coalesced layer of wax.

As shown in FIGS. 3A through 3D, during the initial phases of the coating method only a portion of porous and absorptive paper 11 is saturated or wetted with wax. In the final stages of the method, additional wax is absorbed into paper 11, and the paper may reach a point at which substantially the entire volume of paper is wetted with melted wax. Alternatively, during manufacture of the wax applicator laminate, substantially the entire volume of the paper may be wetted with wax so that during the initial phases of the method substantially the entire volume of the porous and absorptive paper 11 is wetted with melted wax.

Another embodiment of the wax applicator laminate is shown in FIG. 4. The wax applicator laminate comprises a carrier sheet 21 which is made from a pliable sheet of polymeric material. A layer 22 comprising wax is adhered to one surface of carrier sheet 21, and, preferably, one surface of the carrier sheet includes irregularities 23 which assist in adhering wax layer 22 to the surface of carrier sheet 21. The other surface of the carrier sheet is less adherent to solidified wax than the surface containing irregularities to allow the wax applicator laminate to be rolled for storage. Carrier sheet 21 is substantially impervious to the passage of melted wax and, the surface of the carrier sheet 21 opposite the wax layer 22 is substantially nonadhering when heated to temperatures sufficient to melt wax layer 22. To apply a coating of wax using the wax applicator laminate, the carrier sheet is heated, preferably by contacting it with a heated surface such as an iron, to melt the wax and deposit the wax on the surface to be coated. The carrier sheet is then removed to leave a wax coating on the surface.

It should be understood that although specific embodiments of the invention have been described herein in detail, such description is for the purpose of illustration only and modifications may be made thereto by those skilled in the art within the scope of the invention.

We claim the following:

1. A heat actuated wax applicator laminate for applying a thin, generally uniform coating of wax on a surface such as the bottom of a ski or the like by contacting the laminate with a heated surface, comprising:

a sheet of porous and absorptive cellulose material having a first side and a second side;

a layer comprising solidified wax, a portion of said solidified wax layer being absorbed by said porous and absorptive material to bind said solidified wax layer to said second side of said porous and absorptive cellulose material; and a substantially continuous nonadherent barrier coating comprising resin bonded to said first side for being contacted with said heated surface, said nonadherent barrier coating being nonadhering to said heated surface and not becoming tacky at temperatures sufficient to melt said solidified wax and being impermeable to melted wax to substantially prevent melted wax from seeping therethrough to contact said heated surface.

2. A wax applicator laminate according to claim 1 wherein said cellulose fiber paper has a weight of between about 30 and about 50 pounds and has a thickness between about 2 and 5 thousandths of an inch.

3. A wax applicator laminate according to claim 2 wherein said solidified wax layer defines a portion which is not absorbed into said paper, said unabsorbed portion of said layer having a thickness in the range between 1 and about 5 thousandths of an inch.

4. A wax applicator laminate according to claim 3 wherein the cellulose fiber paper is substantially saturated with solidified wax.

5. A wax applicator laminate according to claim 3 wherein a portion of the cellulose fiber paper is saturated with solidified wax.

6. A wax applicator laminate according to claim 3 wherein said nonadherent barrier coating comprises a cured silicon resin.

7. A wax applicator laminate according to claim 6 wherein said solidified wax layer comprises from 20 to 100 weight percent wax.

8. A wax applicator laminate according to claim 7 wherein said unabsorbed portion of said way layer is uniform and continuous.

9. A wax applicator laminate according to claim 8 wherein said unabsorbed portion of said wax is in the shape of a plurality of elongated strips of wax.

* * * * *